UNITED STATES PATENT OFFICE.

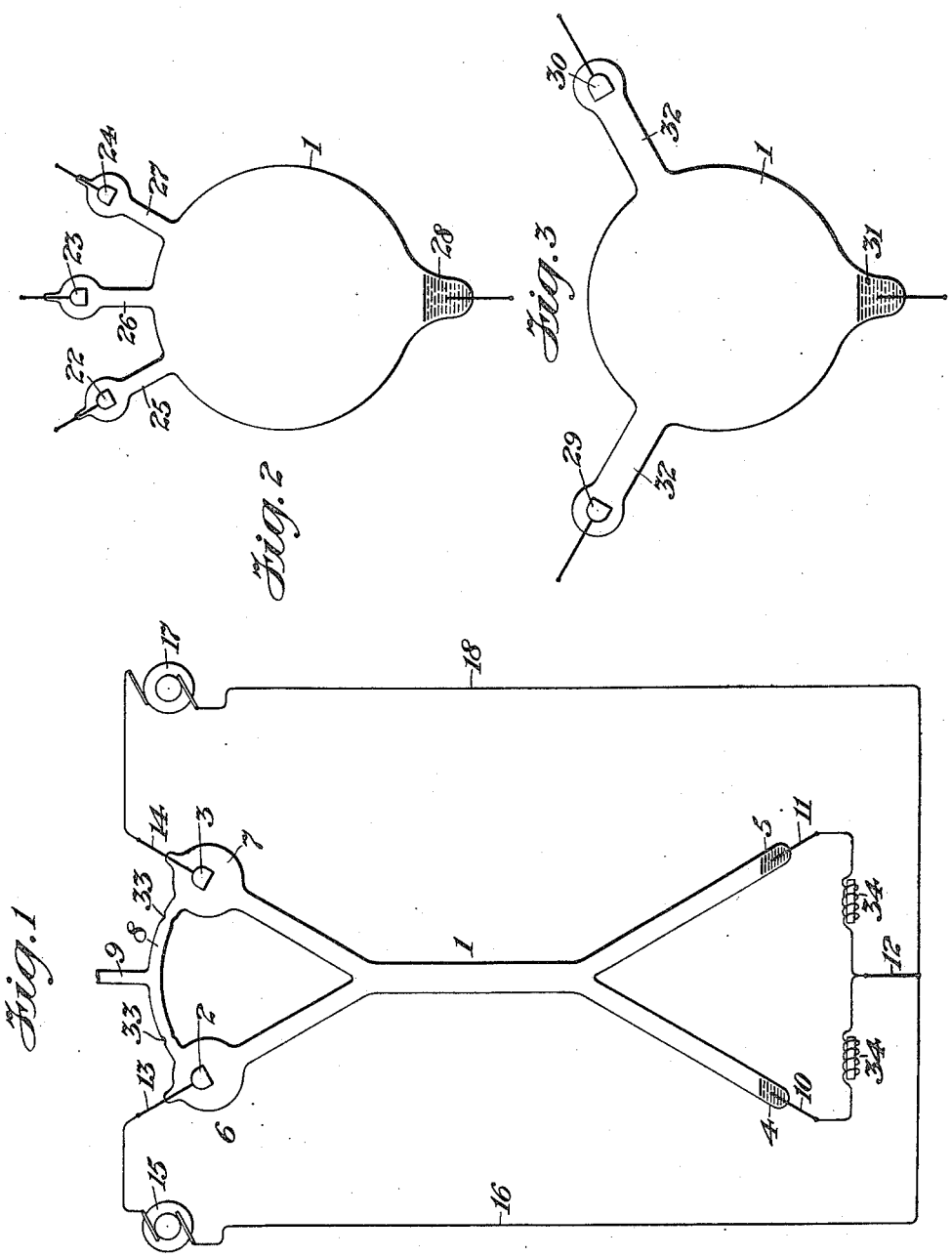

PETER COOPER HEWITT, OF NEW YORK, N. Y., ASSIGNOR, BY MESNE ASSIGNMENTS, TO COOPER HEWITT ELECTRIC COMPANY, OF HOBOKEN, NEW JERSEY, A CORPORATION OF NEW JERSEY.

PROTECTING DEVICE FOR VAPOR APPARATUS.

1,163,665.  Specification of Letters Patent.  Patented Dec. 14, 1915.

Application filed January 11, 1906. Serial No. 295,537.

*To all whom it may concern:*

Be it known that I, PETER COOPER HEWITT, a citizen of the United States, and resident of New York, county of New York, State of New York, have invented certain new and useful Improvements in Protecting Devices for Vapor Apparatus, of which the following is a specification.

In gas or vapor electric apparatus whenever conditions are present which cause a difference of potential between electrodes in the apparatus, there is naturally a greater or smaller tendency for current to pass between the said electrodes. When such current passes in the proper direction between electrodes which are designed to be respectively positive and negative electrodes with relation to each other, there is no injury done and the apparatus is adapted to operate normally. When, however, an electrode which is intended to remain a positive electrode with respect to any of the other electrodes in the apparatus, tends to become a negative it becomes important to check the flow of current before it reaches the point of an actual discharge causing a short-circuit which might be injurious to the electrode or to the apparatus as a whole.

I have invented means for preventing injurious short-circuiting between electrodes, such means consisting of chambers surrounding the several positive electrodes and so arranged that the discharge into said chambers from any other electrode shall be indirect and pass through a path or paths other than in a straight line from electrode to electrode. In this regard more particular attention is paid to the prevention of short-circuits between normal positive electrodes, although means are also provided for preventing the passage of discharge from a normal negative electrode to a normal positive electrode which might be equally disastrous in its results.

To illustrate my invention I have shown several arrangements such, for example, as that of Figure 1 which is a diagram of a vapor electric apparatus and the circuits connected therewith; while Figs. 2 and 3 are elevations of different other types of vapor apparatus involving the same inventive idea.

In Fig. 1, I show an X-shaped vapor device, 1, having positive electrodes, 2 and 3, of iron or other suitable material for positive electrodes and negative electrodes, 4 and 5, which will generally be of mercury or such material as is adapted for use as a negative electrode. The electrodes 2 and 3 are contained in suitable chambers, 6 and 7, and these are connected as shown by a tube, 8, with which an exit tube, 9, is connected to provide for the exhaustion and sealing-off of the apparatus. The ultimate sealing-off takes place at 33, 33, as indicated. The said positive electrodes are arranged near the outer extremities of the upper arms of the X, while the negative electrodes, 4 and 5, are similarly located near the extremities of the lower branches of the X. The central portion between the branches of the X may be of any desired length. The two negative electrodes 4 and 5 are connected, respectively, with lead-wires, 10 and 11 which in turn extend to a common wire, 12, constituting a work or test circuit. The electrodes 2 and 3 have lead-wires, 13 and 14, as shown. The electrode 2 is connected with one pole of a direct current generator, 15, the other pole of which is joined by a wire, 16, to the conductor 12. The electrode 3 is joined to one pole of an alternating current generator, 17, the other pole of which is joined by a wire, 18, with the conductor 12. Assuming now that the apparatus 1 is started, say by a high potential current from the direct current generator 15, or by any other means, and assuming further that the said direct-current generator operates to maintain a current in one direction through the apparatus 1, then the operation of the alternating current generator 17 will result in sending through the apparatus 1 of a current of uniform direction, the waves of opposite polarity being suppressed. In other words, the action of the direct current generator keeps down the normal initial resistance at the negative electrodes 4 and 5 while the tendency of the current from the alternating current generator 17 to pass in a direction from either of the said negative electrodes to the positive electrode 3 is neutralized by the high initial negative electrode resistance at said electrode 3 so long as the latter receives a negative strain.

The same system of circuits shown in connection with Fig. 1, may be used in connection with the apparatus of Figs. 2 and 3, where it has the same general function.

To avoid the likelihood of the described short-circuiting, the electrodes are placed, as shown, in tubular extensions of the main body of the container 1, in such relation that there can be no straight or direct discharge from any one of the electrodes in the apparatus to any other electrode. Thereby the tendency to short-circuiting is greatly restricted and, except in extraordinary cases, is prevented. Figs. 2 and 3 illustrate different forms of vapor converters in which the same principle is generally observed and embodied. The positive electrodes 22, 23 and 24 in Fig. 2 are shielded from mutual short-circuiting by being held in extensions 25, 26 and 27, respectively. In the main, the said electrodes are also shielded from direct discharges from the main negative electrode, 28, although this is not strictly true in regard to the positive electrode 23 as compared with the negative electrode 28. In Fig. 3 the positive electrodes 29 and 30 are not only shielded from each other but from direct mutual discharges between either of said electrodes and the negative electrode 31. The electrodes 29 and 30 are mounted in extensions, 32, 33, of the main container 1 and are placed at such an angle that no direct discharge might take place between any two of the electrodes.

The described arrangement of the electrodes, particularly as between the positive electrodes and the main negative electrode is well suited to the purpose of a high potential vapor converter such as is often required in the arts. Where low potential converters are desired, it may be preferable simply to protect the positive electrodes from short-circuiting with respect to each other, although it is highly desirable in most cases to protect these electrodes also from direct discharges from the main negative electrode.

I sometimes find it desirable to so proportion the rectifier that the chambers surrounding the anodes shall have the plane of their openings substantially at right angles to the plane of the surface of the negative electrode or substantially parallel to the direction of the arc stream in the envelop.

To provide for the placing of the negative electrodes 4 and 5 in multiple with relation to the several generators, 15 and 17, I supply inductances, 34, 34, in the circuit between the electrodes 4 and 5 on opposite sides of the conductor 12.

In an application Serial Number 379,858, filed June 20, 1907, protecting devices for vapor apparatus which is a division of the present case, are claimed certain features of the present invention.

I claim as my invention:

1. A rectifier tube having a plurality of anodes alternating in potential, and a coöperating cathode, and chambers for the respective anodes the openings into which are out of a line connecting the anodes or an anode and the cathode.

2. A tube consisting of an exhausted envelop provided at its lower portion with a vaporizable electrode, and having a plurality of extensions each closed at one end, electrodes located respectively in said extensions above the level of said vaporizable electrode.

3. A mercury vapor rectifier comprising a spherical container with a plurality of extensions branching from the upper hemisphere of said spherical portion, a cathode in the lower portion of the main chamber and anodes in said extensions, the openings into said extensions being out of a line connecting the anodes or an anode and the cathode.

4. A mercury vapor rectifier comprising a main condensing chamber with a cathode therein, a plurality of anodes therefor and tubular portions of said container interposed between said anodes and said main condensing chamber, the openings into said tubular portions being out of a line connecting the anodes or an anode and the cathode.

Signed at New York, in the county of New York, and State of New York, this eighth day of January A. D. 1906.

PETER COOPER HEWITT.

Witnesses:
WM. H. CAPEL,
THOS. H. BROWN.